J. B. WANTZ.
X-RAY APPARATUS.
APPLICATION FILED NOV. 5, 1914.
1,242,498.
Patented Oct. 9, 1917.
9 SHEETS—SHEET 1.
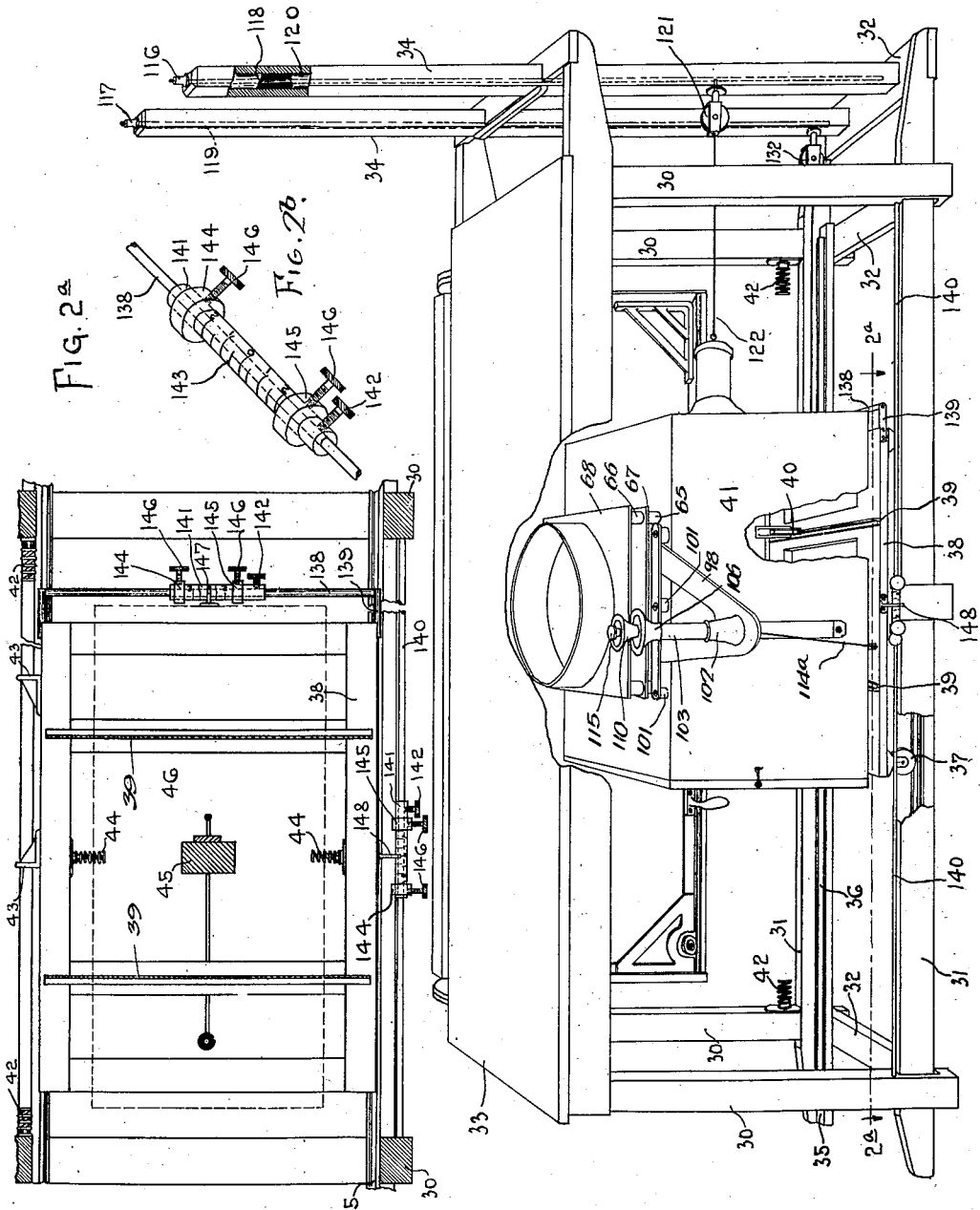
WITNESSES
INVENTOR
JULIUS B. WANTZ
ATTORNEYS

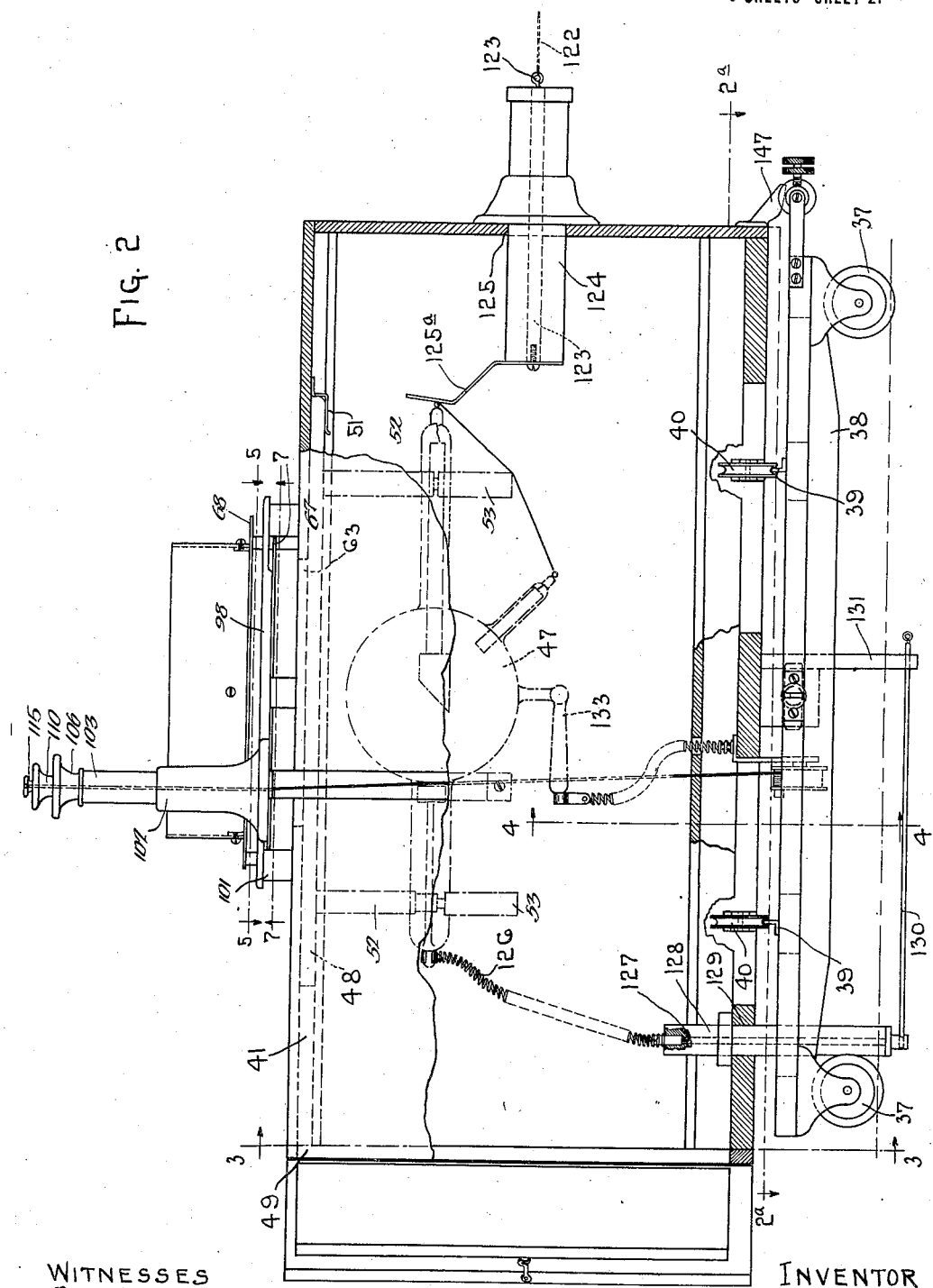

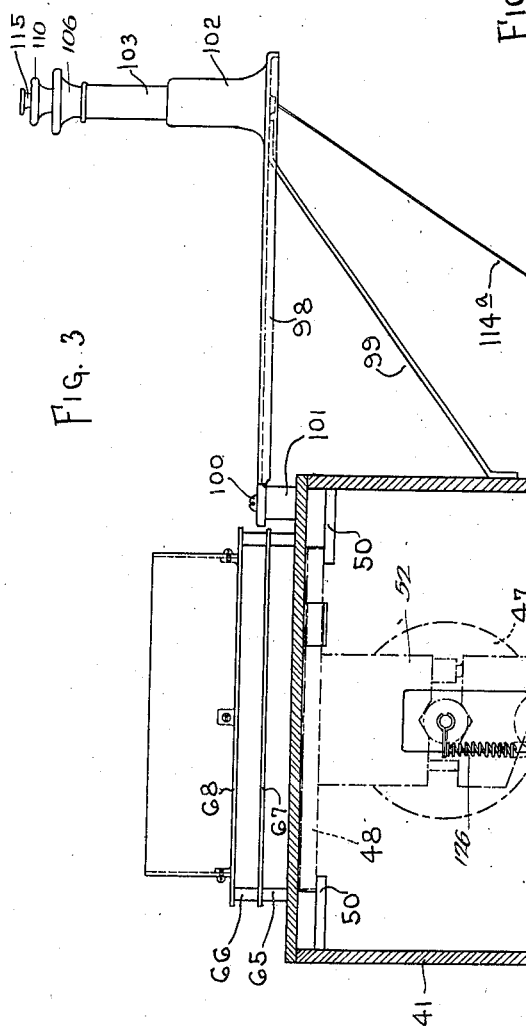

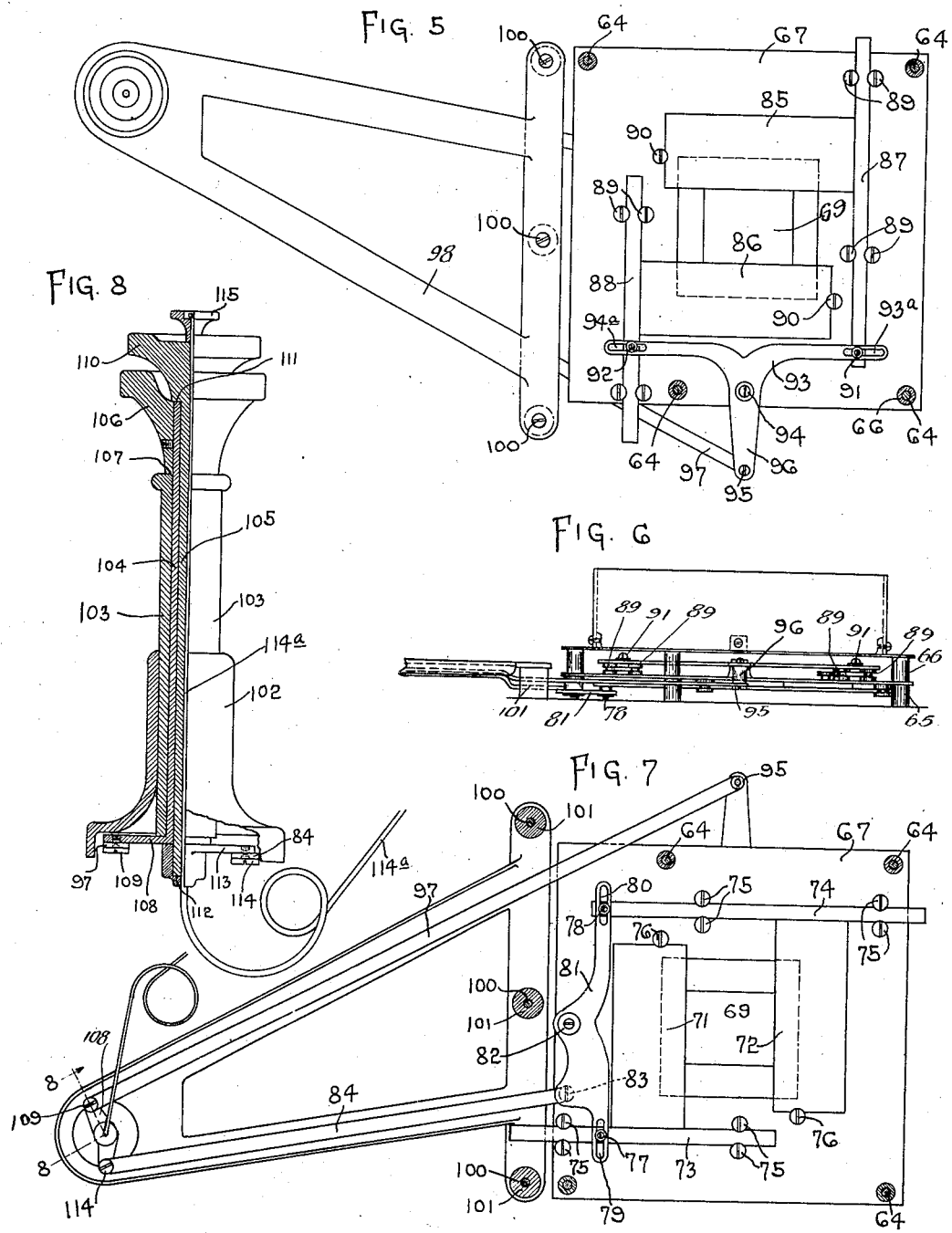

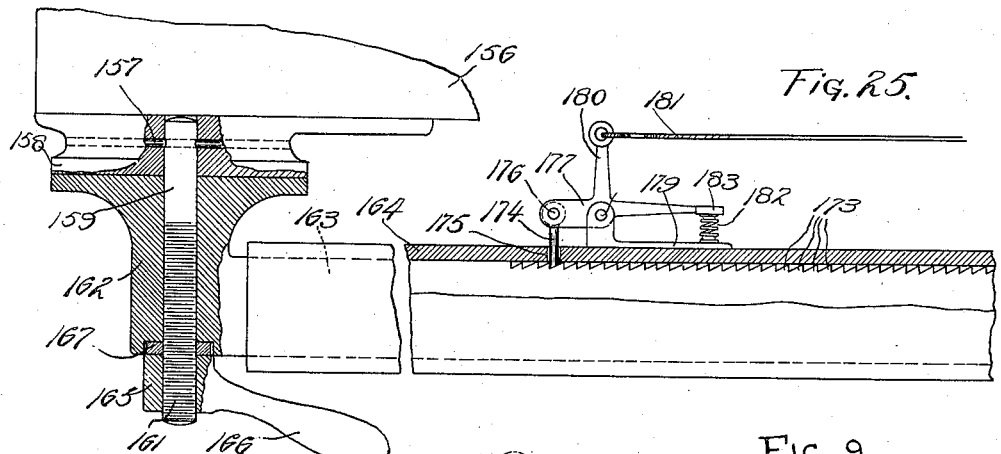
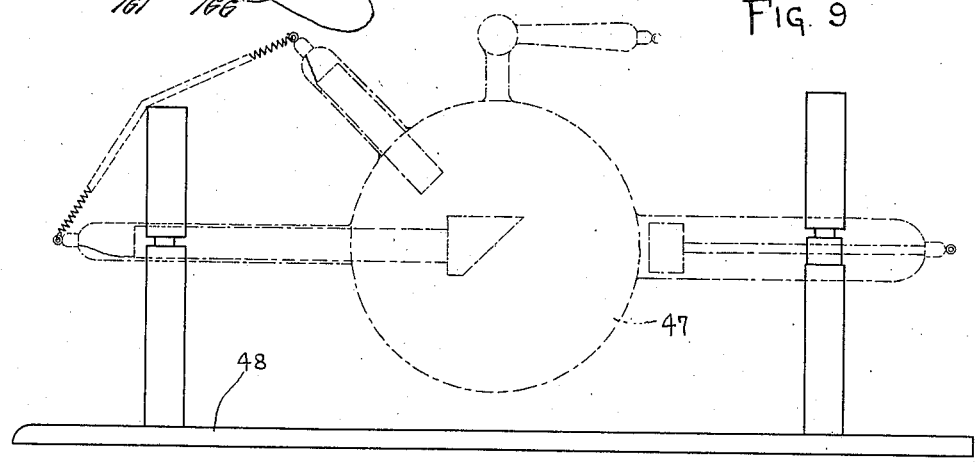
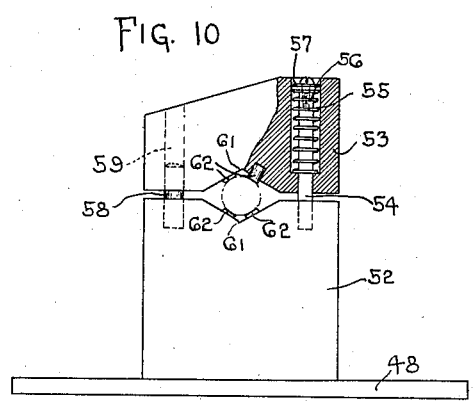
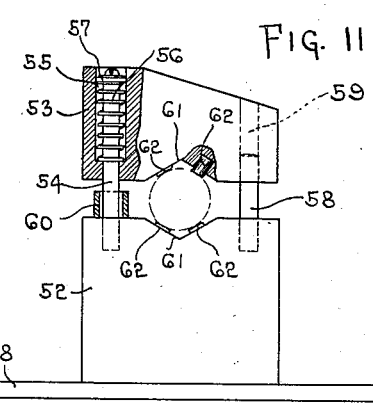

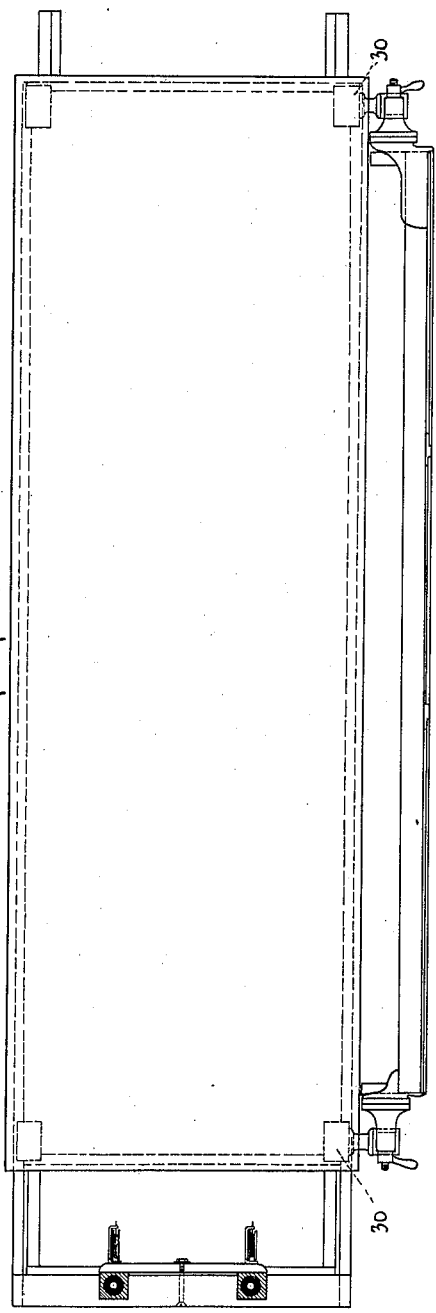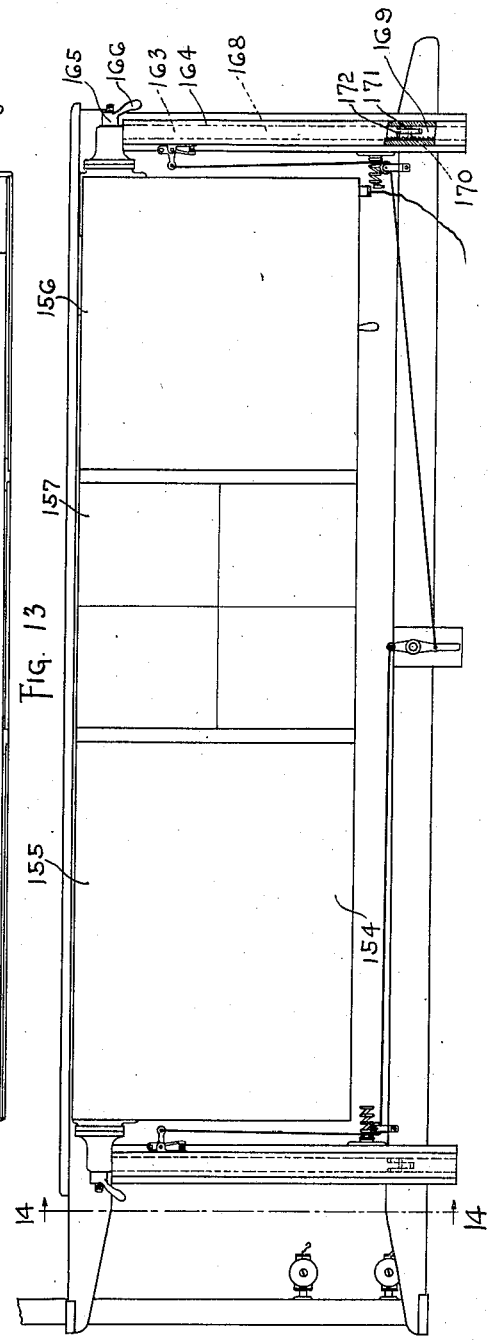

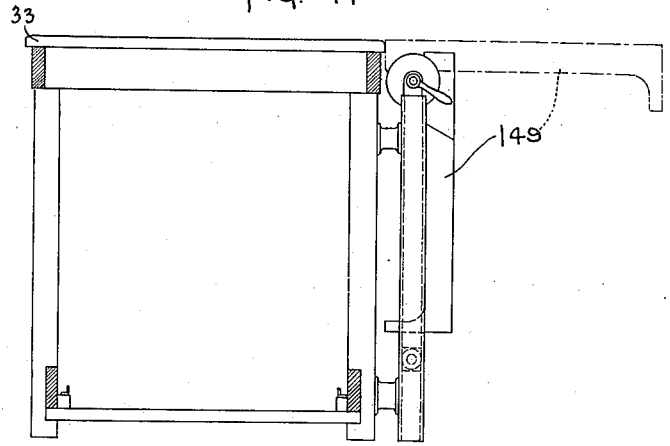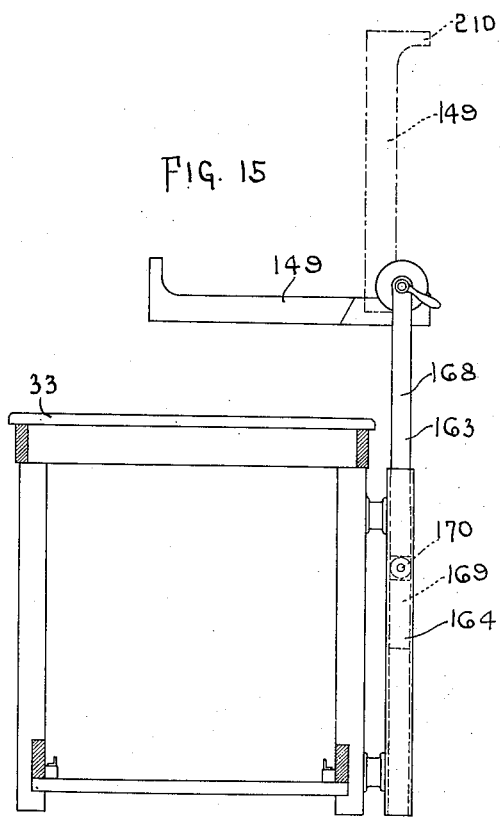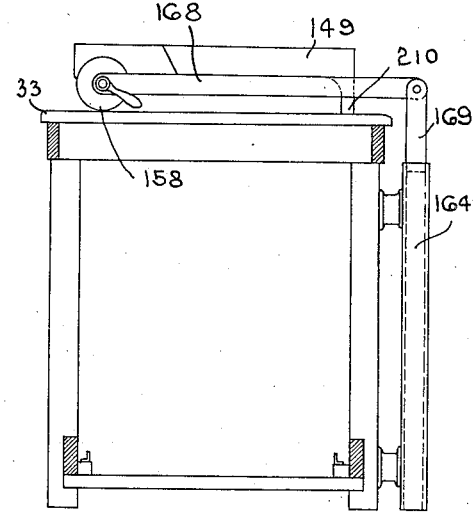

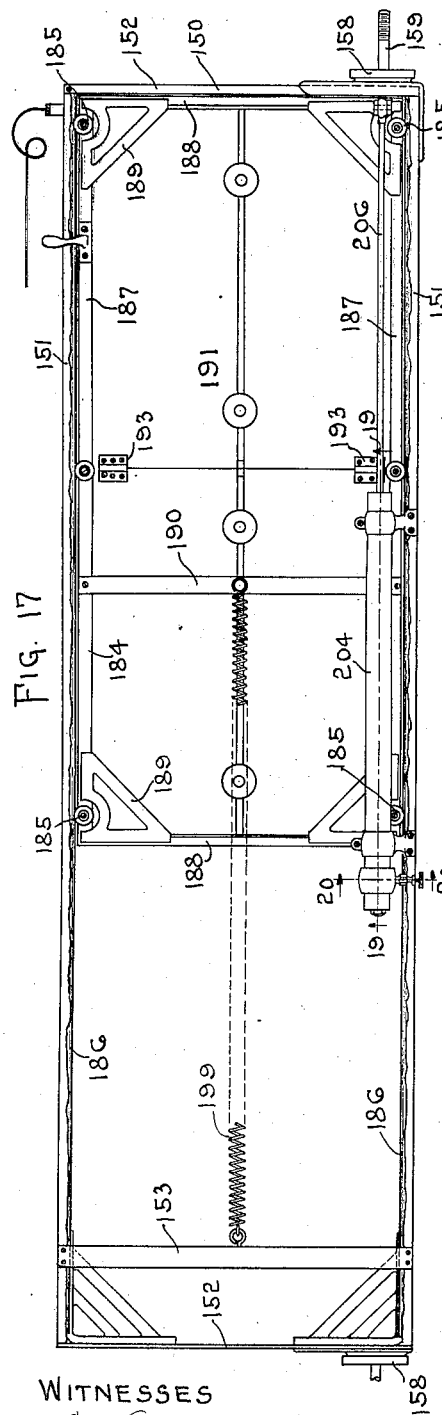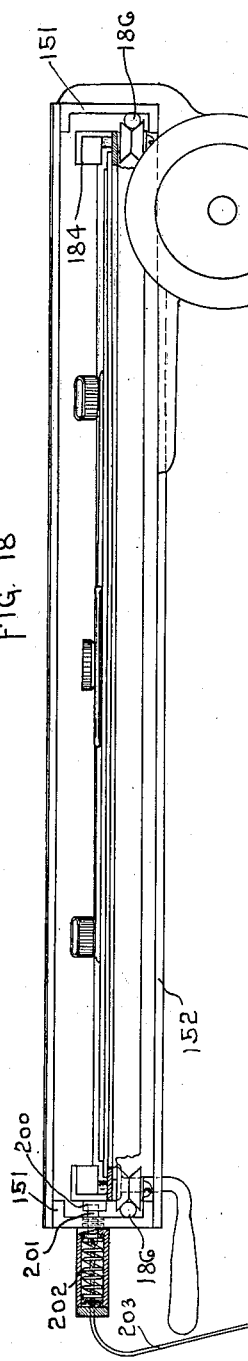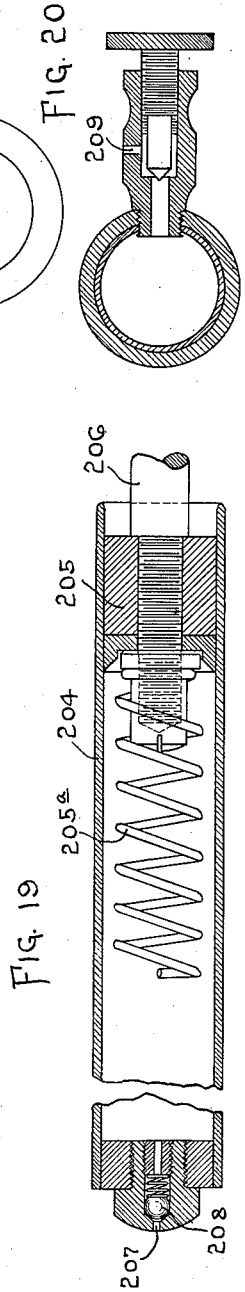

J. B. WANTZ.
X-RAY APPARATUS.
APPLICATION FILED NOV. 5, 1914.
1,242,498.
Patented Oct. 9, 1917.
9 SHEETS—SHEET 9.
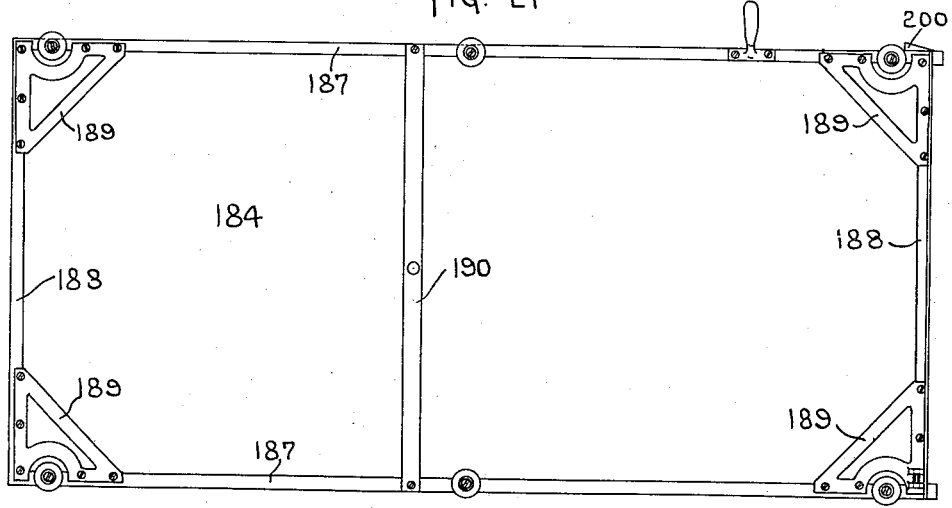
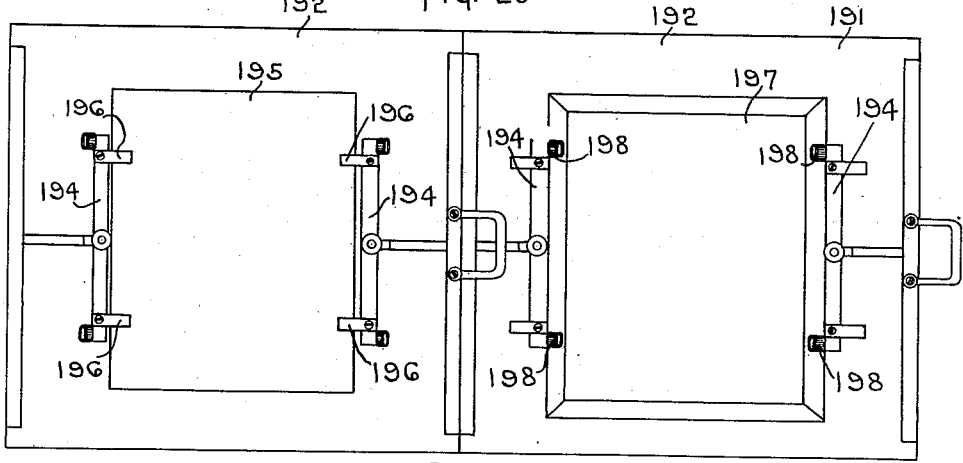
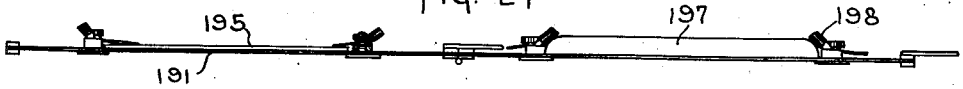
WITNESSES
INVENTOR
JULIUS B. WANTZ
BY Dyrenforth, Lee, Chritton and Wiles
ATTORNEYS

UNITED STATES PATENT OFFICE.

JULIUS B. WANTZ, OF CHICAGO, ILLINOIS, ASSIGNOR, BY MESNE ASSIGNMENTS, TO VICTOR ELECTRIC CORPORATION, OF CHICAGO, ILLINOIS, A CORPORATION OF NEW YORK.

X-RAY APPARATUS.

1,242,498. Specification of Letters Patent. Patented Oct. 9, 1917.

Application filed November 5, 1914. Serial No. 870,462.

*To all whom it may concern:*

Be it known that I, JULIUS B. WANTZ, a citizen of the United States, residing at Chicago, in the county of Cook and State of Illinois, have invented a new and useful Improvement in X-Ray Apparatus, of which the following is a specification.

My invention relates more particularly to what are ordinarily termed X-ray tables for supporting a patient, either for stereoscopic examination or for the taking of X-ray pictures.

My primary object is to provide improvements in tables of this character whereby a table of compact form adapted to be operated in various ways for either stereoscopic or picture work may be provided. Another object of my invention is to provide a construction of table whereby the various operations required in stereoscopic work and the taking of pictures, may be quickly and readily performed and with the minimum inconvenience to the operator; and other objects as will be manifest from the following description.

Referring to the accompanying drawings—

Figure 1 is a perspective view, from one side, of a table constructed in accordance with my invention, portions thereof being broken away to disclose otherwise underlying parts. Fig. 2 is an enlarged view in side elevation of the shiftable X-ray tube container or housing supported on the main portion of the table, portions thereof being broken away to disclose interior details. Fig. 2ᵃ is an enlarged section taken at the lines 2ᵃ on Figs. 1 and 2 and viewed in the direction of the arrow. Fig. 2ᵇ is a perspective view showing in greater detail the means for gaging, in both a lateral and longitudinal direction, the shifting of the tube-box for stereoscopic work. Fig. 3 is a section taken at the line 3 on Fig. 2 and viewed in the direction of the arrow. Fig. 4 is a section taken at the line 4 on Fig. 2 and viewed in the direction of the arrow. Fig. 5 is an enlarged section taken at the line 5 on Fig. 2 and viewed in the direction of the arrow, this view showing in plan a portion of the shutter mechanism coöperating with the X-ray tube. Fig. 6 is a view in side elevation of the mechanism illustrated in Fig. 5. Fig. 7 is an enlarged section taken at the line 7 on Fig. 2 and viewed in the direction of the arrow. Fig. 8 is a view in elevation of the combined shutter, means for controlling one of the circuits of the lamp, and means whereby the shiftable casing for X-ray tube may be moved on the table, a portion of this structure being shown in section, indicated at the irregular line 8—8 in Fig. 7 and viewed in the direction of the arrow. Fig. 9 is a view in elevation of the X-ray tube-holder showing the tube by dotted lines. Fig. 10 is a view in elevation, partly sectional of the holder at the left-hand side of Fig. 9, for one of the ends of the X-ray tube. Fig. 11 is a similar view of the holder at the other side of Fig. 9 for the other end of the X-ray tube. Fig. 12 is a plan view of the entire table with certain parts shown in section. Fig. 13 is a side view of the complete table, with a portion thereof broken away, this showing the side of the table opposite to that illustrated in Fig. 1. Fig. 14 is a section taken at the line 14 on Fig. 13 and viewed in the direction of the arrow, this view showing by full lines the position occupied by the plate-carrying leaf of the table and by dotted lines one of the positions which this leaf may be caused to occupy relative to the top of the main portion of the table. Fig. 15 is a view similar to Fig. 14 showing by full and dotted lines other positions which the leaf may occupy. Fig. 16 is a view similar to Fig. 14 showing another position which the leaf may occupy. Fig. 17 is a plan view of the leaf of the table considering it in the full line position represented in Fig. 15, with certain parts thereof broken away to disclose interior details. Fig. 18 is an end view of the structure shown in Fig. 17. Fig. 19 is an enlarged section taken at the line 19 on Fig. 17 and viewed in the direction of the arrow. Fig. 20 is an enlarged section taken at the line 20 on Fig. 17 and viewed in the direction of the arrow. Fig. 21 is a plan view of the plate-supporting carriage carried by the leaf of the table. Fig. 22 is a view in side elevation of the carriage shown in Fig. 21. Fig. 23 is a plan view of a slide for supporting plates adapted to coöperate with the carriage of Fig. 21. Fig. 24 is a view in side elevation of the holder shown in Fig. 23; and Fig. 25, a view in elevation partly sectional of one end of the leaf of the table and the supporting mechanism therefor.

The main portion of the table is formed of a frame-work comprising uprights 30, cross-pieces 31 and 32, and a table-top 33, preferably of a material transparent to X-rays, there being provided at one end of the table spaced uprights 34 through which the current-conducting wires, hereinafter referred to, extend. The side rails 31 carry inwardly extending flanges 35 on which rails 36 are mounted, these rails serving as guides for rollers 37 provided in pairs at opposite sides of a platform 38, which is provided with parallel rails 39 extending transversely of the rails 36. The rails 39 form guides for rollers 40 which are supported in pairs on a casing 41, of material preferably opaque to X-rays, it being understood from the foregoing description that the casing 41 is thus free to be shifted lengthwise of the main portion of the table and crosswise thereof, as desired, thus permitting the casing to be positioned at any desired point lengthwise or transversely of the main portion of the table, buffer springs 42 provided on certain of the uprights 30 coöperating with bumpers 43 for cushioning the casing 41 at the ends of its movement lengthwise of the table, and buffer springs 44 on the platform 38 being adapted to coöperate with a bumper block 45 carried by the bottom of the casing and extending into an opening 46 in said platform, whereby the casing 41 may be cushioned at the ends of its movement transversely of the table.

The casing 41 is adapted to house the X-ray tube for use in connection with the table, such a tube being represented by dotted lines at 47 (Fig. 2) and supported from the top of the casing 41 preferably in the following manner: Mounted on a slide 48 adapted to be introduced into the casing 41 through its door-controlled end 49 to engage at its edges with flanges 50 extending lengthwise of the casing 41, and adapted to engage at one end with the spring-clip 51 secured to the underside of the top of the casing 41 for holding said slide in position, are depending members spaced apart for engaging the ends of the tube 47. These members which are of similar construction each comprises a member 52 secured to the underside of the slide 48 and a section 53 opposing the section 52. A pin 54 depends from the section 52 and enters a recess 55 extending upwardly into the sections 53, a coiled spring 56 surrounding the pin 54 and bearing at its opposite ends against the upper wall of the recess 55 and a washer 57 on the lower end of the pin 54, this spring tending to force the section 53 upwardly toward the section 52. At the opposite side of the section 52 is a depending pin 58 adapted to enter a recess 59 in the section 53 when the latter is swung on the pin 54 into registration at its recess 59 with the pin 58, it being understood that when the section 53 is pulled down against the resistance of the spring 56, sufficiently far to cause the pin 58 to be withdrawn from the recess 59, the section 53 may be swung on the pin 54 as a pivot. In the case of the holder for the large end of the tube 47, said holder being represented in Fig. 11, the same general arrangement of parts as just explained in connection with the holder for the small end of the tube, is employed, excepting that the pins 54 and 58 in the case of the construction illustrated in Fig. 11 are slightly longer than the pins 54 and 58 of the construction illustrated in Fig. 10, and a spacer sleeve 60 is employed. In the case of both of these holder devices the opposed faces of the sections 52 and 53 are preferably cut away at an angle as represented at 61 to afford a recess between the sections into which centering pins 62 of resilient material, as for example rubber, carried by these sections project, this feature of the construction causing the tube 47 to become centered on the slide 48 upon the act of assembling the tube with the holder devices, the sections 53 of which serve to clamp the respective ends of the tube 47 with the desirable degree of pressure for securely holding the tube against displacement, it being readily understood that by constructing the tube holders as stated, they are adapted to tubes having ends of different diameters.

The slide 48 directly above the tube 47 is either cut away to permit of the passage through the same of X-rays from the tube, or else is formed of material transparent to X-rays, and the top of the casing 41 immediately above the tube 47 likewise either contains an opening, as for example, of the size illustrated at 63, or is of a material transparent to X-rays.

It is desirable that means be provided for varying the area against which the rays are directed, and in the preferred illustrated embodiment of my invention these means are in the form of shutters, a description of which is as follows: Mounted on posts 64 rising from the top of the casing 41 and spaced from the top of the casing and from each other by spacers 65 and 66, are plates 67 and 68 formed of material opaque to X-rays with registering openings 69 therein. Coöperating with the opening 69, in the plate 67, at one side of the latter for varying its dimensions in one direction, are slides 71 and 72 which are fixed in parallel relation to parallel bars 73 and 74, respectively, which slide in guides formed of spaced headed pins 75 depending from the plate 67, the free ends of the slides 71 and 72 being guided by depending headed pins 76 on the plate 67. The bars 73 and 74 carry pins 77 and 78, respectively, which extend into slots 79 and 80, respectively, in a rock member 81 pivotally connected at 82 to the underside of the plate 67, the rock member 82 being pivotally connected at 83 with a link 84 connected with the means hereinafter described for rocking the member 81 to shift the plates 71 and 72 toward or away from each other, depending upon the direction the member 81 is shifted. The other side of plate 67 carries mechanism substantially of the same construction as that carried by the first side of the plate 67, for varying the dimension of the opening 69 in one direction, but at right angles to the direction in the case of the construction shown in Fig. 7. This mechanism comprises plates 85 and 86 fixed on bars 87 and 88, respectively, guided by headed pins 89 on the plate 67, to move parallel with each other, the free ends of the plates 85 and 86 being guided by headed pins 90. The bars 87 and 88 carry pins 91 and 92, respectively, which enter slots 93$^a$ and 94$^a$, respectively, in the ends of a rock member 93 pivoted as indicated at 94 to the plate 67, this rock member being pivotally connected as indicated at 95 to an off-set extension 96 on the member 93, with a link 97 connected with mechanism hereinafter described for shifting it to shift the plates 85 and 86 toward and away from each other, depending upon the direction in which the member 93 is turned. The casing 41 carries a laterally extending frame 98 braced as indicated at 99, this frame being supported on the top of the casing 41 through the medium of screws 100 passing through spacers 101 surrounding the screws and interposed between the frame and the top of the casing. The outer end of the casing is provided with an upwardly extending seating member 102 containing an interior sleeve 103 surrounding telescoped sleeves 104 and 105, the latter being independently rotatable in the sleeve 103. The sleeve 104 at its upper end is provided with a hand-gripping head 106, affording a shoulder 107 which opposes the upper end of the sleeve 103, and at its lower end carries a disk 108 which opposes the lower end of the sleeve 103, this disk being connected at a point eccentric of its axis, with the outer end of the link 97, as indicated at 109, whereby this link may be shifted in either direction by turning the sleeve 104. The innermost sleeve 105 has a hand-gripping head 110 providing a shoulder 111 which opposes the upper end of the sleeve 104, a collar 112 fixed on the lower end of the sleeve 105 opposing the disk 108. The collar 112 is provided with an extension 113 to the outer end of which the outer end of the link 84 is pivotally connected, as indicated at 114, whereby this link may be adjusted lengthwise in either direction by turning the sleeve 105. A cord 114$^a$ extends upwardly through the opening in the sleeve 105 and is equipped with a button 115, this cord being provided for a purpose hereinafter explained. It will be understood from the foregoing that the sleeves 104 and 105 are independently rotatable and thus the slides 71 and 72 and slides 85 and 86 may be adjusted independently of each other to vary the size and shape of the opening through which the rays from the tube 47 project.

In the particular arrangement illustrated, the wires for conducting the current to the tube 47 connect with binding posts 116 and 117, connected with wires 118 and 119, respectively, which extend through insulated conduits 120 in the uprights 34, one of said conduits only being shown. The wire 118 is electrically connected with a tautening device 121, having a wire 122 reeled thereon and constructed to cause the wires 118 and 122 to be in electrical contact as is well understood in the art, the wire 122 being connected with one end of a bar 123 confined in a sleeve 124 of insulating material located in an opening 125 in one end of the casing 41, the inner end of the bar 123 carrying a spring-contact finger 125$^a$ which engages one of the terminals of the tube 47 when the latter is positioned in the case 41, as hereinbefore explained. The other terminal of the tube 47 is connected through the medium of a flexible electrical connector 126 with a wire 127 extending through an insulated sleeve 128 fixed in an opening 129 in the bottom of the casing 41, the wire 127 being connected with one end of a horizontally extending bar 130, the opposite end of which is fixed in a depending brace 131 secured to the bottom of the casing 41, this end of the bar 130 connecting with a wire (not shown) which connects with a tautening device 132 of the same construction as the device 121, and electrically connected with the wire 119.

It being desirable under certain conditions to reduce the vacuum of the tube, to accomplish which the tube 47 is, in accordance with common practice, provided with a tube-extension 133 containing a chemical (not shown) which when current is passed therethrough produces a gas, I provide means whereby the current instead of passing through the wire 126 will pass through the tube-extension 133, this being accomplished by providing a contact-finger 134, fixed on a disk 135, pivoted as indicated at 136 to the platform 38. When the disk 135 is rotated from the position represented in Fig. 4 in anti-clockwise direction, it moves the contact 134 into engagement with the bar 130, thereby causing the current to pass through the tube-extension 133 for the purpose above stated. As a convenient means for operating the disk 135, I wind about its periphery the free end of the cord 114ª, which has the button 115, as hereinbefore described, whereby upon pulling up on the button 115 the contact finger 134 is moved into engagement with the bar 130, the disk 135 containing a coiled spring 137 which serves to automatically return the disk to a position in which the contact-finger 134 occupies the full line position represented in Fig. 4 when the operator releases the pull on the button 115.

It will be understood from the foregoing that the device formed in part of the various telescoping sleeves hereinbefore described, serves as a central control not only for adjusting the elements of the shutter and controlling the direction of the current through the tube 47, but also in that it is in the nature of a handle device, serving to permit the operator by grasping it to shift the tube-containing casing 41 on the main portion of the table to any desirable position, this feature of the construction being of great advantage in practice, as will be readily understood by those skilled in the art.

The universal adjustment of the casing 41 in a horizontal plane permits the tube to be moved lengthwise, and transversely of the table, at will, and thus the operator may, by shifting the casing 41 on its guides, cause the tube to be positioned at any desirable point beneath the patient, or permits the operator to move the tube through such paths that a complete examination of the patient may be effected.

In the preferred illustrated embodiment of my invention, provision is made for gaging the shifting of the casing 41 either lengthwise, or transversely, of the table for use in taking stereoscopic pictures, in which case the table, in so far as above described, will coöperate with plate-shifting means as hereinafter described. The gaging means for lateral adjustment referred to comprises a bar 138 supported to extend transversely of the guides 36, on extensions 139 carried by the platform 38 and for longitudinal adjustment, a bar 140 extending lengthwise of the guides 36 and supported at opposite ends on opposing uprights 30. A sleeve 141 is adjustable along each bar 138 and 140 and is adapted to be clamped in position on the bar which it surrounds by a set-screw 142, this sleeve having a scale thereon calibrated in inches, as represented at 143, and collars 144 and 145 adjustable along the sleeve 141 and adapted to be held in position of adjustment by set-screws 146, screwing against the sleeve 141. The platform 38 is provided with a lug 147 into the path of movement of which, when the platform 38 is shifted on the guides 39, the collars 144 and 145 on the rod 138, extend, assuming that the set-screws 142 and 146 are adjusted as stated, the platform at its side carrying a lug 148 into the path of which the collars 144 and 145 on the rod 140 extend when the set-screws 142 and 146 are adjusted as stated, it being understood from the foregoing that if the taking of a stereoscopic picture is to be effected by making the second exposure by shifting the tube transversely of the table, the sleeve 141 and collars 144 and 145 on the rod 138 will be preliminarily adjusted to the proper positions for restricting the shifting of the casing 41 transversely of the table throughout a predetermined length of path, as will be understood by those skilled in the art, and where the second exposure is to be made by shifting the tube 47 lengthwise of the table, the collar and sleeves on the rod 140 will be used as explained of the collars and sleeve on the rod 138.

Supplementing and adapted to coöperate with the main portion of the table described, is a structure in the nature of a leaf constructed to support an X-ray plate or plates for use in taking pictures, either stereoscopic or otherwise, of patients placed on the table-top 33, or for use in taking pictures of patients placed upon the leaf after stereoscopic examination on the table-top 33. This leaf is represented in Figs. 14, 15 and 16 at 149, and is formed of a frame-work 150, comprising parallel channeled side members 151, end cross-pieces 152, braced as indicated to the side pieces 151, a cross-brace 153, and a covering 154 for the frame having sections 155 and 156 at its opposite ends formed of material opaque to X-rays with an intermediate section 157 of a material transparent to X-rays. The leaf thus formed is provided at its opposite ends near one marginal edge with disk-extensions 158 in which pins 159 extending lengthwise of the leaf are securely fixed, as by pins 160 (Fig. 25). The outer ends of the pins 159, which are in effect stub-shafts, are screw-threaded as indicated at 161 and extend at their screw-threaded ends through heads 162 provided on the upper ends of vertically movable members 163 supported to be adjustable up and down relative to the table-top 33, in guide-ways 164 secured to the uprights 30 at one side of the main portion of the table. The outer ends of the shafts 159 have screwed thereon nuts 165 provided with handle-sections 166, and washers 167 are interposed between the nuts 165 and the outer recessed ends of the heads 162. The construction just described is provided for the purpose of permitting the leaf 149 to be rotated upon the supporting members 163 to any desirable position relative to the table-top 33 and clamped in such adjusted position, this being effected by tightening up the nuts 165.

The supporting members 163 are each formed of a relatively long upper section 168 and a relatively short lower section 169 pivotally connected together as represented at 170, it being preferred that the lower section 169 be bifurcated at its upper end as indicated at 171 and that the lower end of the coöperating section 168 be of reduced thickness to enter between the arms of the bifurcated portion 171, as indicated at 172, the pivot pin 170 passing through the overlapping ends of these sections.

It will be understood from the foregoing that the members 163 may be adjusted to such an elevation that the section 168 thereof will remain within the guides 164, in which case the pivotally connected sections of these members will remain in alinement, or that the members 163 may be adjusted to such an elevation that the sections 169 thereof only will be in the guides 164, thus permitting the sections 168 to be swung at angles to the sections 169 for a purpose hereinafter described.

The uprights 162 may be held in adjusted position by any suitable means, it being desirable that those illustrated be employed, the following being a description of the same: One edge of each of the sections 168 and 169 carries ratchet teeth 173 adapted to engage with a pawl 174, one adjacent to each guide 164, these pawls operating through openings 175 in the guides and pivotally connected as indicated at 176 at their outer ends to one arm of a bell-crank lever 177 pivotally supported as indicated at 178 on a bracket 179 on the adjacent guide 164, the arm 180 of each bell-crank being connected with a cable 181 for actuating the bell-crank 177 against the action of a spring 182 interposed between the bracket 179 and a third arm 183 on the bell-crank 177, for withdrawing the pawl 174 from engagement with the teeth 173 when it is desired to lower the leaf, it being understood that in lifting the leaf 149, the pawls 174 automatically operate to hold the leaf in vertically adjusted position until released by pulling on the cables 181, as above stated.

Coöperating with the frame 150 of the leaf is a carriage 184 supported at rollers on guides 186 provided in the channels of the frame members 151, whereby these guides extend longitudinally of the leaf, the carriage 184 which is thus adapted to be shifted on the frame 150 lengthwise thereof, is formed of side members 187, end members 188 connected therewith and braced as indicated at 189, and a cross-member 190. Coöperating with the carriage is a slide 191 preferably formed of sections 192 hinged together as indicated at 193, this slide being provided with clip devices 194 adapted to be adjustably positioned on the sections 192 for clamping a plate such as that represented at 195 against the plate 191 by engagement of the spring-fingers 196 on the clips and adapted to clamp a plate-holder such as that represented at 197 and containing a plate (not shown) to the plate 191 at the extensions 198 of the clips, this being the general type of device which is more fully illustrated and described in my co-pending application Serial No. 818,926, filed February 16, 1914. In use, the slide 191 after having an X-ray plate or plates applied thereto as stated, would be moved with the carriage 184 to the position illustrated in Fig. 17.

In the taking of stereoscopic pictures, it is desirable that after one exposure is made and the X-ray tube shifted to the position for making the second exposure, the second plate be shifted to occupy the place previously occupied by the first plate, and this is usually accomplished by spring-actuated mechanism which is releasably held in one position during the making of the first exposure and thereafter released to drive the carriage to a position in which the second plate will occupy the space previously occupied by the first plate. In the construction illustrated, this result is accomplished by connecting the carriage 184 with a coiled spring 199, connected with the cross-piece 153, with a projection 200 on one side of the carriage which is adapted to interlock with a pin 201 on the frame 150 when the carriage is shifted to the right to the position illustrated in Fig. 17, wherein the first plate on the slide 191 registers with the section 157, this pin being backed up by a spring 202 which causes it to normally project into the path of movement of the projection 200, and being withdrawable from engagement with said projection by drawing on a cable 203 connected with the pin 201, means being provided for cushioning the movement of the carriage 184 to the left in Fig. 17 under the action of the spring 199 when the pin 201 is released, and for limiting the movement of said carriage under the action of said spring to properly position the second plate in the space previously occupied by the first plate, the illustrated means for this purpose being as follows: Secured to the frame 150 is a cylinder 204 containing a piston 205 on a rod 206 connected with the right-hand end of the carriage 184 in Fig. 17. The rear end of the cylinder contains an inlet 207 controlled by an inwardly opening check-valve, the cylinder being provided with a valved outlet 209. The piston and cylinder mechanism just described operates to regulate the speed at which the carriage moves when propelled by the spring 199, as hereinbefore stated, the adjustment of the valve at the outlet 209 regulating the speed, the carriage being brought to a stop for properly positioning the second plate, upon withdrawing the pin 201 from engagement with the projection 200 by the spring 205$^a$ carried by the piston 205 engaging the bottom of the cylinder 204 carried on the frame 151. As hereinbefore stated, the plate-carrying leaf 149 may be caused to assume any one of a number of positions relative to the table-top 33, by adjusting the leaf at its pivotal connections with the members 163, and by adjusting these last referred to members as hereinbefore stated. In Figs. 14, 15 and 16, I have shown four positions which the leaf may be caused to occupy when in operative relation to the table-top 33, these being given merely as examples. In Fig. 14, the full line position of the leaf 149 represents the latter folded out of the way when not in use. The dotted position of the leaf shows it extended in line with the table-top 33. In this position, it presents the advantage of obviating the necessity of lifting the patient from one table where stereoscopic examination takes place, to another table where the pictures are taken. In the arrangement shown, the operator may make a stereoscopic examination of the patient while on the table-top 33, using a screen in accordance with common practice. Upon completing the examination, the patient may be merely shifted to the leaf 149 and by using an X-ray tube which is suitably supported above the leaf 149 as by an X-ray stand (not shown), such as is usually employed, an exposure of the plate or plates, as the case may be, carried by the leaf 149, may be effected. The leaf 149 in the full line position represented in Fig. 15 is positioned for the making of a single picture or stereoscopic pictures by employing the X-ray tube in the casing 41 beneath the table-top 33. In this case the uprights 163 are adjusted to the desired height and the leaf swung on its trunnions to a horizontal position to extend above a patient on the table 33, the pictures being taken on the plate or plates, as the case may be, carried by the leaf 149. The dotted line position of the leaf in Fig. 15 illustrates how this leaf may be used to take a picture of a patient when it is desired that the portion to be photographed be erect. In this case the leaf is adjusted to extend vertically permitting the patient to lean against it, in which case it would coöperate with an X-ray tube which would be brought into proper position on the opposite side of the patient, as for example, an X-ray tube (not shown) mounted on a portable holder generally employed. This feature of adjustment of the leaf 149 also avoids the necessity of lifting a patient from one table to another, as a stereoscopic examination of the patient may be made while reclining on the table 33 and by merely raising the patient to position him against the leaf 149, a picture may be taken.

Fig. 16 shows a position into which the leaf 149 may be folded where it is desired to take a picture or stereoscopic pictures of a patient supported on the leaf, the X-rays being supplied by a tube (not shown) positioned above the patient, as by using a tube supported on a portable holder as that hereinbefore referred to. In this position of the leaf, the uprights 163 are raised to a position in which the sections 168 are lifted clear of the guides 164 and swung toward the table-top into horizontal position, the leaf being turned backwardly at its trunnions to rest at the disk-heads 158 and feet 210, on the table-top 33. It will be understood from the foregoing that the carriage supported in the leaf 149 is free to be operated in any of the positions of the leaf illustrated.

While I have illustrated and described a certain particular construction embodying my invention, I do not wish to be understood as intending to limit it thereto as the same may be variously modified and altered without departing from the spirit of my invention, it being my intention to claim my invention as fully and completely as the prior state of art will permit.

What I claim as new and desire to secure by Letters Patent is—

1. In X-ray apparatus, the combination of a guide-equipped member, a carriage mounted to move on said guide and provided with guides, a slide adapted to be telescoped with said last named guides and be disengaged therefrom, and tube-supporting means on said slide, whereby said slide and the tube carried thereby may be bodily removed as a unitary structure from said carriage.

2. In an X-ray table, the combination of a suitably supported table-top, guides on said table, a carriage mounted to move on said guides, the latter being provided with guides, a slide adapted to be telescoped with the guides on said carriage and be disengaged therefrom, and tube-supporting means on said slide whereby said slide and the tube carried thereby may be bodily removed as a unitary structure from said carriage.

3. In X-ray apparatus, the combination of a guide-equipped member, a carriage mounted to move on said guide and provided with guides, a slide adapted to be telescoped with said last-named guides and be disengaged therefrom, and depending members carried by said slide and adapted to support an X-ray tube thereon, whereby said slide and the tube carried thereby may be bodily removed as a unitary structure from said carriage.

4. In an X-ray table, the combination of a suitably supported table-top, guides on said table, a carriage mounted to move on said guides and provided with guides, a slide adapted to be telescoped with the guides on said carriage and be disengaged therefrom, and depending members carried by said slide and adapted to support an X-ray tube thereon, whereby said slide and the tube carried thereby may be bodily removed as a unitary structure from said carriage.

5. In X-ray apparatus, the combination of a guide-equipped member, a carriage mounted to move on said guide, and provided with guides and including a housing of material opaque to X-rays in which said last-named guides are located, a slide adapted to be telescoped with said last-named guides and to be disengaged therefrom, and tube-supporting means on said slide, whereby said slide and the tube carried thereby may be bodily removed as a unitary structure from said housing.

6. X-ray tube-supporting means comprising a pair of suitably-supported spaced members, each formed of opposing sections adapted to clamp the tube-end between the opposing surfaces of said opposing sections, guide-pins at opposite sides of the portions of said sections which engage the tube upon which said sections are relatively adjustable toward and away from each other, and yielding means for yieldingly forcing said sections toward each other.

7. X-ray tube-supporting means comprising a pair of suitably-supported spaced members each formed of opposing sections, the opposing surfaces of said sections being recessed, and sections of resilient material set into sockets in said recesses and adapted to engage at their outer ends opposite sides of a tube-end and draw the latter to a central position.

8. X-ray tube-supporting means comprising a pair of suitably-supported spaced members each formed of opposing sections, one of said sections being pivoted on, and movable toward and away from, the other thereof, the opposing surfaces of said sections being recessed, yieldable means tending to draw said sections together, and means for holding said pivoted section from turning until said sections are separated a predetermined distance in opposition to said yieldable means.

9. X-ray tube-supporting means comprising a pair of suitably-supported spaced members each formed of opposing sections, one of said sections being pivoted on, and movable toward and away from, the other thereof, the opposing surfaces of said sections being recessed, a spring surrounding the pivot of said pivoted section and adapted to draw said sections together, and means for holding said pivoted section from turning until said sections are separated a predetermined distance in opposition to said spring.

10. In X-ray apparatus, the combination of a supporting member, X-ray-tube-holding means movably supported on said member, shutter mechanism in position to coöperate with a tube on said tube-holding means and movable with the latter and formed of independently operable elements, and a plurality of independently operative shutter-controlling means for operating said shutter elements, respectively, and independently of each other, said plurality of shutter-controlling means being connected with said tube-holding means, and constructed and arranged to serve as means by which the operator may shift said holding means.

11. In X-ray apparatus, the combination of a supporting member, X-ray-tube-holding means movably supported on said member, shutter mechanism in position to coöperate with a tube on said tube-holding means and movable with the latter and formed of independently operable elements, and a plurality of independently operative shutter-controlling means for operating said shutter elements, respectively, and independently of each other, said plurality of shutter-controlling means being connected with said tube-holding means, said last named means including telescoping rotatable sleeves with means connected therewith and with said shutter elements, respectively, for operating said shutter elements, and serving as a means by which the operator may shift said holding means.

12. In X-ray apparatus, the combination of a supporting member, X-ray-tube-holding means movably supported on said member, shutter mechanism in position to coöperate with a tube on said tube-holding means and movable with the latter, and formed of independently operable elements, and a plurality of independently operative shutter-controlling means for operating said shutter elements, respectively, and independently of each other, said plurality of shutter-controlling means being connected with said tube-holding means, said last named means including telescoped rotatable sleeves, with links connected with said sleeves, respectively, eccentric of the axis of said sleeves and with said shutter elements, said sleeves serving as a means by which the operator may shift said holding means.

13. In X-ray apparatus, the combination of a table, X-ray-tube-holding means movably supported on said table, shutter mechanism in position to coöperate with a tube on said tube-holding means and movable with the latter and formed of independently operable elements, and shutter-controlling means for independently operating said shutter elements, connected with said tube-holding means and constructed and arranged to serve as a means by which the operator may shift said holding means.

14. In X-ray apparatus, the combination of a table, X-ray-tube-holding means movably supported on said table, shutter mechanism in position to coöperate with a tube on said tube-holding means and movable with the latter and formed of independently operable elements, and shutter-controlling means for independently operating said shutter elements, connected with said tube-holding means, said last-named means including telescoped rotatable sleeves with means connected therewith and with said shutter elements, respectively, for operating said shutter-elements, and serving as a means by which the operator may shift said holding means.

15. In X-ray apparatus, the combination of a table, X-ray-tube-holding means movably supported on said table, shutter mechanism in position to coöperate with a tube on said tube-holding means and movable with the latter and formed of independently operable elements, and shutter-controlling means for independently operating said shutter elements connected with said tube-holding means, said last-named means including telescoped rotatable sleeves with links connected with said sleeves, respectively, eccentric of the axis of said sleeves and with said shutter elements, said sleeves serving as a means by which the operator may shift said holding means.

16. In X-ray apparatus, the combination of a table, X-ray-tube-holding means movably supported on said table, shutter mechanism in position to coöperate with a tube on said tube-holding means and movable with the latter, a shiftable electrical contact, and shutter-controlling means and means for shifting said contact grouped together at a central station and connected with said tube-holding means.

17. In X-ray apparatus, the combination of a supporting member, X-ray-tube-holding means movably supported on said member, shutter mechanism in position to coöperate with a tube on said tube-holding means and movable with the latter, a shiftable electrical contact, and shutter-controlling means and means for shifting said contact grouped together at a central station and connected with said tube-holding means.

18. In X-ray apparatus, the combination of a supporting member, X-ray-tube-holding means movably supported on said member, shutter mechanism in position to coöperate with a tube on said tube-holding means and movable with the latter, a shiftable electrical contact, and shutter-controlling means and means for shifting said contact grouped together at a central station and connected with said tube-holding means and serving as a means by which the operator may shift said holding means.

19. In X-ray apparatus, the combination of a table, X-ray-tube-holding means movably supported on said table, shutter mechanism in position to coöperate with a tube on said tube-holding means and movable with the latter, a shiftable electrical contact, and shutter-controlling means and means for shifting said contact grouped together at a central station and connected with said tube-holding means and serving as a means by which the operator may shift said holding means.

20. In X-ray apparatus, the combination of a table, X-ray-tube-holding means movably supported on said table, shutter mechanism in position to coöperate with a tube on said tube-holding means and movable with the latter and formed of independently operable elements, a shiftable electrical contact, and shutter-controlling means for independently operating said shutter elements, connected with said tube-holding means, said last-named means including telescoped rotatable sleeves with devices connected therewith and with said shutter elements, respectively, for actuating said elements, and means for shifting said contact, including a shiftable member extending into said sleeves and in position to be operated.

21. In X-ray apparatus, the combination of a table, X-ray-tube-holding means movably supported on said table, shutter mechanism in position to coöperate with a tube on said tube-holding means and movable with the latter and formed of independently operable elements, a shiftable electrical contact, and shutter-controlling means for independently operating said shutter elements, connected with said tube-holding means, said last-named means including telescoped rotatable sleeves with devices connected therewith and with said shutter elements, respectively, and means for shifting said contact, including a cord which extends through said sleeves.

22. In X-ray apparatus, the combination of a supporting member, X-ray-tube-holding means movably supported on said member, shutter mechanism in position to coöperate with a tube on said tube-holding means and movable with the latter and formed of independently operable elements, a shiftable electrical contact, and shutter-controlling means for independently operating said shutter elements, connected with said tube-holding means, said last-named means including telescoped rotatable sleeves with devices connected therewith and with said shutter elements, respectively, for actuating said elements, and means for shifting said contact, including a shiftable member extending into said sleeves and in position to be operated.

23. In X-ray apparatus, the combination of a supporting member, X-ray-tube-holding means movably supported on said member, shutter mechanism in position to coöperate with a tube on said tube-holding means and movable with the latter and formed of independently operable elements, a shiftable electrical contact, and shutter-controlling means for independently operating said shutter elements, connected with said tube-holding means, said last-named means including telescoped rotatable sleeves with devices connected therewith and with said shutter elements, respectively, and means for shifting said contact, including a cord which extends through said sleeves.

24. In X-ray apparatus, the combination of a supporting member, X-ray-tube-holding means movably supported on said member, shutter mechanism in position to coöperate with a tube on said tube-holding means and movable with the latter and formed of independently operable elements, a shiftable electrical contact, and shutter - controlling means for independently operating said shutter elements, connected with said tube-holding means, said last-named means including telescoped rotatable sleeves with devices connected therewith and with said shutter elements, respectively, for actuating said elements, and means for shifting said contact, including a shiftable member extending into said sleeves and in position to be operated, said sleeves forming a handle by which said tube-holding means may be shifted, whereby the shifting of the tube-holding means, the actuation of said shutter elements, and the actuation of said means for shifting said contact are grouped together at one point.

25. In X-ray apparatus, the combination of a supporting member, X-ray-tube-holding means movably supported on said member, shutter mechanism in position to coöperate with a tube on said tube-holding means and movable with the latter and formed of independently operable elements, a shiftable electrical contact and shutter - controlling means for independently operating said shutter elements, connected with said tube-holding means, said last-named means including telescoped rotatable sleeves with devices connected therewith and with said shutter elements, respectively, and means for shifting said contact, including a cord which extends through said sleeves, said sleeves forming a handle by which said tube-holding means may be shifted, whereby the shifting of the tube-holding means, the actuation of said shutter elements, and the actuation of said means for shifting said contact are grouped together at one point.

26. The combination of a main table section constructed and arranged for use in fluoroscopic work, an X-ray-plate-supporting-and-shifting member mounted on the table to be movable to a position thereon in which it rests on, and extends substantially coextensive with, said main table section and forms a means for supporting a patient and supporting and shifting plates beneath the latter and movable to a position in which said main table section is freed of obstruction to allow the latter to support a patient.

27. The combination of a main table section constructed and arranged for use in fluoroscopic work, an X-ray-plate-supporting-and-shifting member mounted on said main table section, the axis of said pivot being in a substantially horizontal plane and above said table top, said member being movable to a position in which it rests on and extends substantially coextensive with, said main table section and forms a means for supporting a patient and supporting and shifting plates beneath the latter, and movable to a position in which said main table section is freed of obstruction to allow the latter to support a patient.

28. The combination of a main table section constructed and arranged for use in fluoroscopic work, an X-ray-plate-supporting-and-shifting member mounted on said main table section, the axis of said pivot being in a substantially horizontal plane and above said table top, said member being movable to a position in which it rests on, and extends substantially coextensive with, said main table section and forms a means for supporting a patient and supporting and shifting plates beneath the latter, and movable to a position in which said main table section is freed of obstruction to allow the latter to support a patient, and means for holding said member in different positions of angular adjustment about its pivotal support.

29. The combination of a main table section, constructed and arranged for use in fluoroscopic work, an X-ray-plate-supporting-and-shifting member mounted on said table section to be bodily raised relative to said table section and be folded to a position at one side of said main table section for freeing the latter of obstruction to allow it to support a patient and movable on said main table section to a position in which it rests on, and extends substantially coextensive with, said main table section and forms a means for supporting a patient, and supporting and shifting plates beneath the latter.

30. The combination of a main table-section, members adjustable up and down on said main section, and an X-ray-plate-supporting member having pivotal connection with said members in a horizontal plane to adapt said plate-supporting member to swing from depending position to a position in which it extends over the top of said main section.

31. The combination of a main table-section, supporting members adjustable up and down on said main section and each formed of relatively adjustable sections, and an X-ray-plate-supporting member having pivotal connection with certain of said supporting member sections in a horizontal plane, and means adjusting those of said sections with which said plate-supporting member is pivotally connected for varying the vertical position of said pivotal connection.

32. The combination of a main table-section, supporting members adjustable up and down on said main section and formed of pivotally-connected rods, and an X-ray plate-supporting member pivotally connected with the upper ones of said rods, for the purpose set forth.

33. The combination of a main table-section carrying upright guides, supporting-members adjustable up and down in said guides and each formed of pivotally-connected sections, said members being adapted to be adjusted to an elevation at which the uppermost sections of said members extend free of said guides, and an X-ray-plate-supporting member pivotally connected with the upper sections of said supporting-members.

34. The combination of a main table-section, members located at one side of said table-section and adjustable up and down thereon, and an X-ray-plate-supporting member pivotally connected at its extreme ends to said supporting-members, said supporting-members being constructed and arranged to permit of the adjustment of said pivotal connection into different positions in a horizontal plane for the purpose set forth.

35. In X-ray apparatus, the combination of a main table-section, an X-ray tube-holder mounted on said main section to be shiftable thereon in a horizontal plane and supported to extend below the top of said main section, and plate-holding and shifting means pivotally supported on said main section to extend above the top of the latter and movable on said pivot to a position in which the main table section is freed of obstruction for supporting a patient thereon, the axis of said pivot being in a horizontal plane, for the purpose set forth.

36. In X-ray apparatus, the combination of a main table section, an X-ray tube-holding device supported on said main section to support a tube below the top of said section, and shiftable on the latter lengthwise and transversely of said main section, and plate-holding and shifting means pivotally supported on said main section in a position to extend over the top of the latter and movable on said pivot to a position in which the main table section is freed of obstruction for supporting a patient thereon, the axis of said pivot being in a horizontal plane, for the purpose set forth.

37. In an X-ray table, the combination of a suitably-supported table-top, a support for the X-ray tube supported on the table to be longitudinally movable thereon, and means for limiting the movement of said X-ray support longitudinally of the table for stereoscopic work, said means being bodily adjustable for permitting of the said limited movement of said X-ray support at different locations in the horizontal plane.

38. In an X-ray table, the combination of a suitably-supported table-top, a support for an X-ray tube supported on the table to be movable thereon in a horizontal plane, a suitably-supported bar, a sleeve mounted on said bar to be shiftable along the latter and provided with stops adapted to coöperate with said X-ray tube-support for limiting the movement of the latter in stereoscopic work, and means for releasably securing said sleeve in its different positions on said bar, for the purpose set forth.

39. In an X-ray table, the combination of a suitably supported table-top, a support for an X-ray tube supported on the table to be movable thereon in a horizontal plane, a bar on said table, a sleeve movable on said bar, collars adjustably mounted on said sleeve, to be adjusted back and forth relatively to each other, and means for releasably securing said sleeve to said bar.

40. In a table, the combination with its main section, of a plate-holding member supported on the table and adapted to be moved into and out of a position in which it rests upon the table-top, in which position it furnishes a support for a patient, and adapted to be moved into and out of a position in which it extends in substantially parallel relation above the table-top and spaced therefrom.

41. In a table, the combination with its main section, of a plate-holding member supported on the table and adapted to be moved into and out of a position in which it rests upon the table-top, in which position it furnishes a support for the patient and into and out of depending position at one side of the table.

42. In a table, the combination with its main section, of a plate-holding member supported on the table and adapted to be moved into and out of a position in which it rests upon the table-top, in which position it furnishes a support for a patient and movable into and out of depending position at the side of the table, and adapted to be moved into a position in which it extends substantially parallel with the table-top and above the latter.

43. In X-ray apparatus, the combination of X-ray tube-holding means, shutter mechanism in position to coöperate with a tube on said tube-holding means and formed of independently operable elements, and a plurality of independently operative shutter-controlling means for operating said shutter elements, respectively, and independently of each other, said shutter-controlling means including telescoping rotatable sleeves with means connected therewith and with said shutter elements, respectively, for operating said shutter elements.

44. In X-ray apparatus, the combination of X-ray tube-holding means, shutter mechanism in position to coöperate with a tube on said tube-holding means and formed of independently operable elements, and a plurality of independently operative shutter-controlling means for operating said shutter elements, respectively, and independently of each other, said plurality of shutter-controlling means, including telescoped rotatable sleeves, with links connected with said sleeves, respectively, eccentric of the axis of said sleeves and with said shutter elements.

JULIUS B. WANTZ.

In the presence of—
 JAMES S. THELEN,
 E. HUMPHREYS.